(12) United States Patent
Horton et al.

(10) Patent No.: US 6,474,464 B1
(45) Date of Patent: Nov. 5, 2002

(54) MODULAR BELT WITH TAPERED OBLONG HINGE PINS

(75) Inventors: Paul L. Horton, Metairie; David W. Bogle, Destrehan; John C. Hawkins, Jr., Mandeville, all of LA (US); William R. Hartness, III, Greenville; Mark W. Davidson, Greer, both of SC (US)

(73) Assignees: The Laitram Corporation, Harahan, LA (US); Hartness International, Greenville, SC (US)

( * ) Notice: Subject to any disclaimer, the term of this patent is extended or adjusted under 35 U.S.C. 154(b) by 0 days.

(21) Appl. No.: 09/701,127

(22) PCT Filed: Jun. 15, 1999

(86) PCT No.: PCT/US99/13435

§ 371 (c)(1),
(2), (4) Date: Nov. 21, 2000

(87) PCT Pub. No.: WO99/65801

PCT Pub. Date: Dec. 23, 1999

Related U.S. Application Data

(60) Provisional application No. 60/107,171, filed on Nov. 5, 1998, and provisional application No. 60/089,420, filed on Jun. 16, 1998.

(51) Int. Cl.[7] .............................................. B65G 17/06
(52) U.S. Cl. ...................................... 198/853; 198/850
(58) Field of Search ................................. 198/850, 853

(56) References Cited

U.S. PATENT DOCUMENTS

| | | | |
|---|---|---|---|
| 4,138,011 A | * 2/1979 | Lapeyre | 198/853 X |
| 4,140,025 A | 2/1979 | Lapeyre | 74/255 R |
| 4,925,016 A | 5/1990 | Lapeyre | 198/834 |
| 5,125,874 A | 6/1992 | Fryer et al. | 474/214 |
| 5,174,439 A | 12/1992 | Spangler et al. | 198/853 |
| 5,346,059 A | 9/1994 | Irwin | 198/852 |
| 5,358,096 A | * 10/1994 | Faulkner et al. | 198/850 X |
| 5,431,275 A | 7/1995 | Faulkner | 198/853 |
| 5,439,751 A | 8/1995 | Fesler | 428/614 |
| 6,241,080 B1 | * 6/2001 | Tuomikoski | 198/853 X |

* cited by examiner

Primary Examiner—James R. Bidwell
(74) Attorney, Agent, or Firm—James T. Cronvich

(57) ABSTRACT

A modular conveyor belt (20) constructed of a series of rows (24, 25) of belt modules hingedly interlined by tapered oblong hinge pins (22) and suitable for following straight or curved conveyor paths. Aligned slots (30) formed in one set of hinge elements between successive rows are elongated in the direction of belt travel to allow the belt to fan out in turns. Fan-shaped apertures (38) formed in interleaved hinge elements of an adjacent row and aligned axially with the slots to admit a hinge pin (22) allow the belt to pivot at the hinge to articulate about a sprocket (181) or idler (186) or to enter and exit an incline. The oblong hinge pin has a first region at a first end (88) with a constant long axis to share the belt load among hinge elements encompassing the first region on straight runs. A second region of the hinge pin at an opposite second end (89) has a tapered oblong cross section, the long axis of which increases with distance from the second end to define a variable pitch and to spread the belt tension among the hinge elements at the outside of a turn encompassing the second region. Each belt row can be constructed of individual links stacked together on a support element (45) and retained by fasteners (52) or of integrally molded modules each comprising a transverse connecting member from which leading and trailing hinge elements extend. Accessory attachments, such as teeth (160) or sideguards (150), can be added to the belt. The belt can be driven by a cog, a roller chain, or other driving means driving lugs (172) extending from the bottom of the belt. The drive surfaces of the lugs can be obliquely arranged for better load sharing.

35 Claims, 15 Drawing Sheets

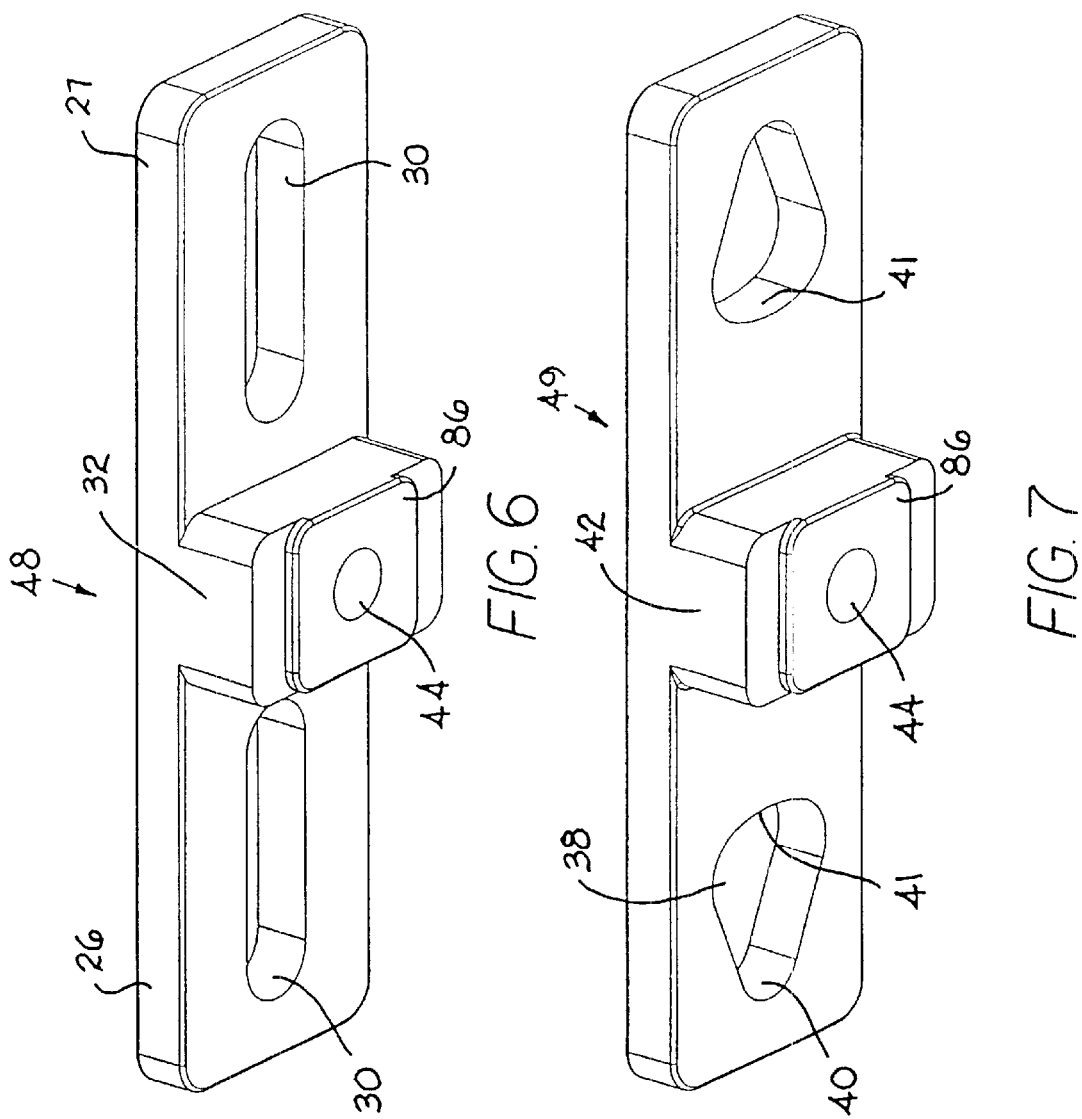

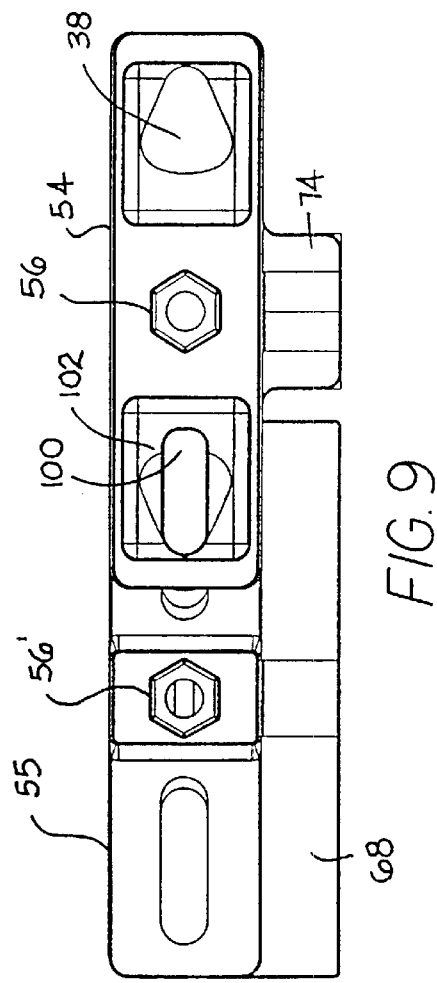
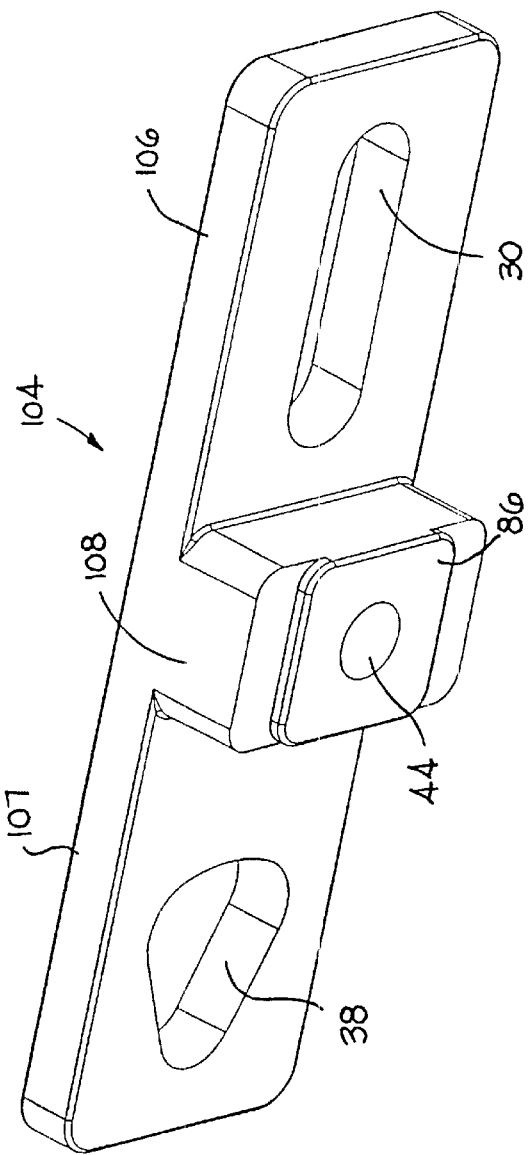
FIG. 9
FIG. 11

MODULAR BELT WITH TAPERED OBLONG HINGE PINS

This application is a 371 of PCT/US99/13435 filed Jun. 15, 1999, which claims benefit of provisional application 60/089,420 filed Jun. 16, 1998 which claims benefit of provisional application 60/107,171 filed Nov. 5, 1998.

TECHNICAL FIELD

The invention relates to conveyor belts and, more particularly, to modular plastic conveyor belts constructed of plastic belt modules hingedly interlinked by tapered oblong hinge pins.

BACKGROUND ART

Because they do not corrode and are easy to clean, plastic conveyor belts are used widely, especially to convey food products. Modular plastic conveyor belts are made up of molded plastic modular links, or belt modules, arranged in rows. Spaced apart link ends extending from each end of the modules include aligned apertures to accommodate a pivot rod. The link ends along one end of a row of modules are interleaved with the link ends of an adjacent row. A pivot rod, or hinge pin, journalled in the aligned apertures of the end-to-end-connected rows, connects adjacent rows together to form a two-ended belt or an endless conveyor belt capable of articulating about a drive sprocket.

In many industrial applications, conveyor belts are used to carry products along paths including curved, as well as straight, segments. Belts capable of flexing sidewise to follow curved paths are referred to as side-flexing, turn, or radius belts. As a radius belt negotiates a turn, the belt must fan out because the edge of the belt at the outside of the turn follows a longer path than the edge at the inside of the turn. To enable the belt to fan out, the apertures in the link ends on one end of each row are typically elongated in the direction of belt travel. The elongated apertures allow the belt to collapse at the inside of a turn and to spread at the outside.

The requirement of following a curved path causes problems not found in straight-running belts. For example, because the elongated apertures of conventional radius belts are identical in length across the width of the belt, only one or a very few of the link ends at the outside of a turn bear the entire belt pull. On a straight run, the belt pull is distributed across the entire width of the belt. Unless the outer link ends are specially bolstered, the belt pull strength rating is limited by the pull strength in a turn, which is often up to ten times less than on a straight. Thus, radius belts must be heavier and stronger than straight-running belts conveying the same load.

A conveyor belt having special edge modules with closer link end spacing and tapered pivot rod slots for circular pivot rods to improve the distribution of the pull at the outside of a turn is disclosed in U.S. Pat. No. 5,164,139, issued Dec. 29, 1992. The patent also discloses the use of a semi-tapered circular rod with untapered pivot rod slots to achieve a similar effect. A belt made up of those edge modules, however, still confines the belt pull in a turn to only a few closely spaced, thin link ends at the outside of the turn. The belt's strength in turns is less than on straight runs. The disparity in strength is greater the wider the belt. Thus, belt strength must be wasted to accommodate turns.

A radius belt that uses a rotatable tapered link shaft is described in U.S. Pat. No. 5,431,275, issued Jul. 11, 1995. The link shafts have a longitudinal axis, a straight surface for carrying the tensile load between adjacent rows in a turn. The tapered surface is disposed angularly about the longitudinal axis relative to the straight surface. The tapered surface intersects the straight surface so as to form a transition zone along which the tensile load on the straight surface is rotatably transferred to the tapered surface when the conveyor belt changes from traveling on a straight path to a radial path. Such a link shaft has complex outer surfaces and must not be impeded by dirt and debris from rotating properly between surfaces to be effective in transferring load as the belt goes from a straight to a curved path. The patent also discloses the use of tapered shaft apertures to help share tensile loads, but such apertures are difficult to mold.

A sought-after feature in radius belts is a low turning ratio, i.e., the ratio of the radius of the tightest conveyor turn path to the width of the belt. Most radius belts have turning ratios of about 2:1 or greater. Thus, turns must be long and gradual, taking up otherwise usable space. Smaller turning ratios are generally limited by interference between the interleaved link ends as they collapse at the inside of a turn. Conventional line ends are formed along parallel, straight axes and tend to bind in turns. A dual-pitch belt that collapses better at the inside of a turn disclosed in U.S. Pat. No. 5,346,059, issued Sep. 13, 1994. The belt shown has shorter link ends on the inside half of the belt than on the outside half, which allows the inside edge to collapse tighter. The pivot rod apertures along each half, however, are slotted in transverse alignment with one another, and the load is borne by only the outermost and centermost link ends in a turn. On a straight run, belt pull is shared among many link ends. Consequently, the belt must be made much stronger or its load derated in order to handle the turns.

DISCLOSURE OF INVENTION

Wasted belt strength, large differences in pull strength on straights and turns, complex provided designs, molding difficulties, and other shortcomings are avoided by the invention, which provides a modular conveyor belt capable of following straight or curved paths. The belt is constructed of a succession of rows of belt modules having hinge elements projecting from each end and spaced apart along the width of the row. The forward hinge elements of a row are interleaved with the rearward hinge elements of an adjacent row. Openings in the interleaved hinge elements are generally aligned to form a passageway across the width of the rows to accommodate, preferably, a tapered oblong hinge pin, which forms a hinge between adjacent rows.

In a preferred version of the belt, the hinge pin includes a first region and a second region. The first region extends from a first end of the pin toward an opposite second end. The second region extends from the second end toward the first region. The cross section of the hinge pin over the first region is oblong with a long axis in the direction of belt travel having a constant length. The cross section of the hinge pin over the second region is generally oblong, but with the length of the long axis of the cross section increasing with distance from the second end to a maximum length less than or equal to the length of the constant long axis in the first region. A belt using such hinge pins thus enjoys the advantages of variable pitch.

In another version, the hinge pin includes a third transition region between the first and second regions, also oblong in cross section in which the length of the long axis of the cross section in the third region varies from the constant long axis of cross section in the first region to the maximum long axis of the cross section in the second region to provide a smooth transition from straight to curved conveying paths and vice versa. The oblong hinge pin with the transition region allows belt tensile loads to be shared among a number of hinge elements in turns, on straights, and in transitions between turns and straights. In this way, the belt does not have to be oversized just to enable it to handle turns.

In a preferred version of the belt, the hinge elements of consecutive rows have different-shaped openings. In a first row, the openings in the hinge elements at both ends are elongated oblong slots having dimensions greater than the maximum cross-section dimensions of the hinge pin. The length of the elongation is greater than the oblong hinge pin's constant cross-sectional long axis to allow the belt to fan out at the outside of a turn and collapse at the inside of a turn. In a second row of a preferred version, the openings in the hinge elements at each end are in the form of fan-shaped sectors having a radius slightly greater than the greatest dimension of the hinge pin's cross section. The vertex of the fan-shaped apertures is toward the distal ends of the hinge elements. The fan shape accommodates the oblong hinge pin and allows the belt to back flex and to flex forward to articulate about a drive sprocket or idler.

Preferably, for belts used to negotiate curves in one direction only, the hinge elements are curved slightly along the turning radius to provide better strength in a turn and to enable a smaller turning radius without unduly stressing the ends of the hinge elements.

In yet another version of the belt, each row comprises a series of generally identical links disposed side by side. Each link comprises a hinge element at either end extending from a central transverse element. The transverse element has a central bore parallel to the openings in the hinge elements. The central bore admits a support element, such as a threaded rod or bolt, on which a plurality of links can be stacked side by side to form a belt row. The transverse elements act as spacers to allow spaces between consecutive hinge elements to accommodate the hinge elements of an adjacent row. Fastener hardware at each side of the row engage that ends of the bolt and hold the stack of links together. The individual links allow custom belts of different widths to be made simply.

The individual link design also makes it easier to add various other accessories and features to the belt by incorporating the features into special links. For example, links having depending drive lugs for an intermediate drive, or side-projecting gear teeth for engaging a horizontal gear wheel, or depending holddown guides can be formed on individual links and used where needed. Furthermore, special belt edge links at the side edges of each row could be used to provide recesses for the fastener hardware for the bolt so that protrusions are eliminated and the side edge of the belt is less likely to snag objects is passes. Thus, the individual links allow for a custom belt to be made with only a small collection of interfitting parts.

BRIEF DESCRIPTION OF DRAWINGS

These and other features, aspects, and advantages of the invention are better understood with reference to the following description, claims, and drawings in which:

FIG. 6 is a perspective view of a link used in the first row of the belt of FIG. 1A;

FIG. 7 is a perspective view of a link used in the second row of the belt of FIG. 1A;

FIG. 9 is a side elevation view of two rows of the belt as in FIG. 1B showing retention of a hinge pin;

FIG. 11 is a perspective view of another version of a link useful in constructing a belt having features of the invention, but using a single row pattern;

MODES FOR CARRYING OUT THE INVENTION

Figure 1A:
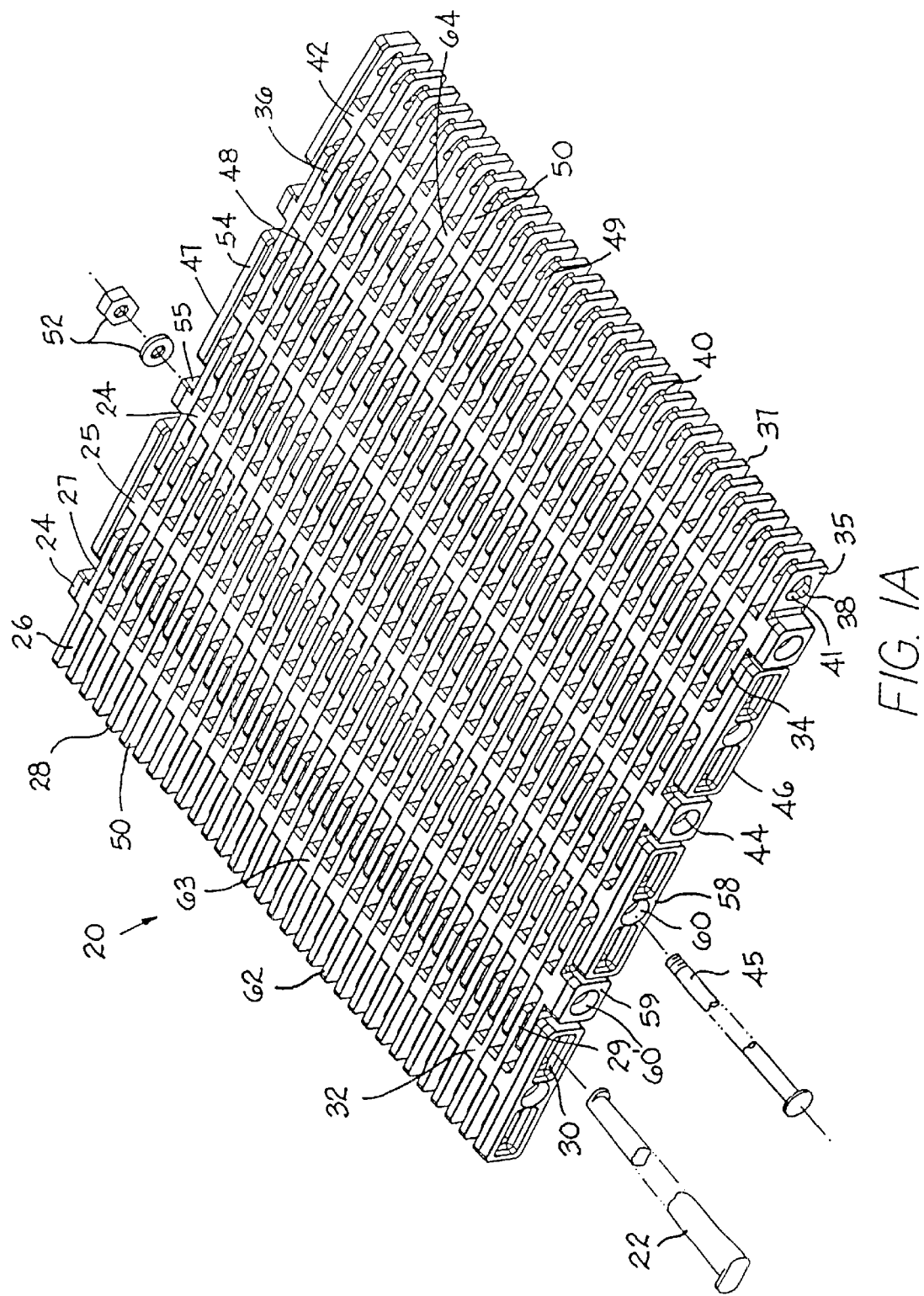
FIG. 1A is a partial top perspective view from a first edge of one version of a conveyor belt according to the invention negotiating a turn.
Figure 1B:
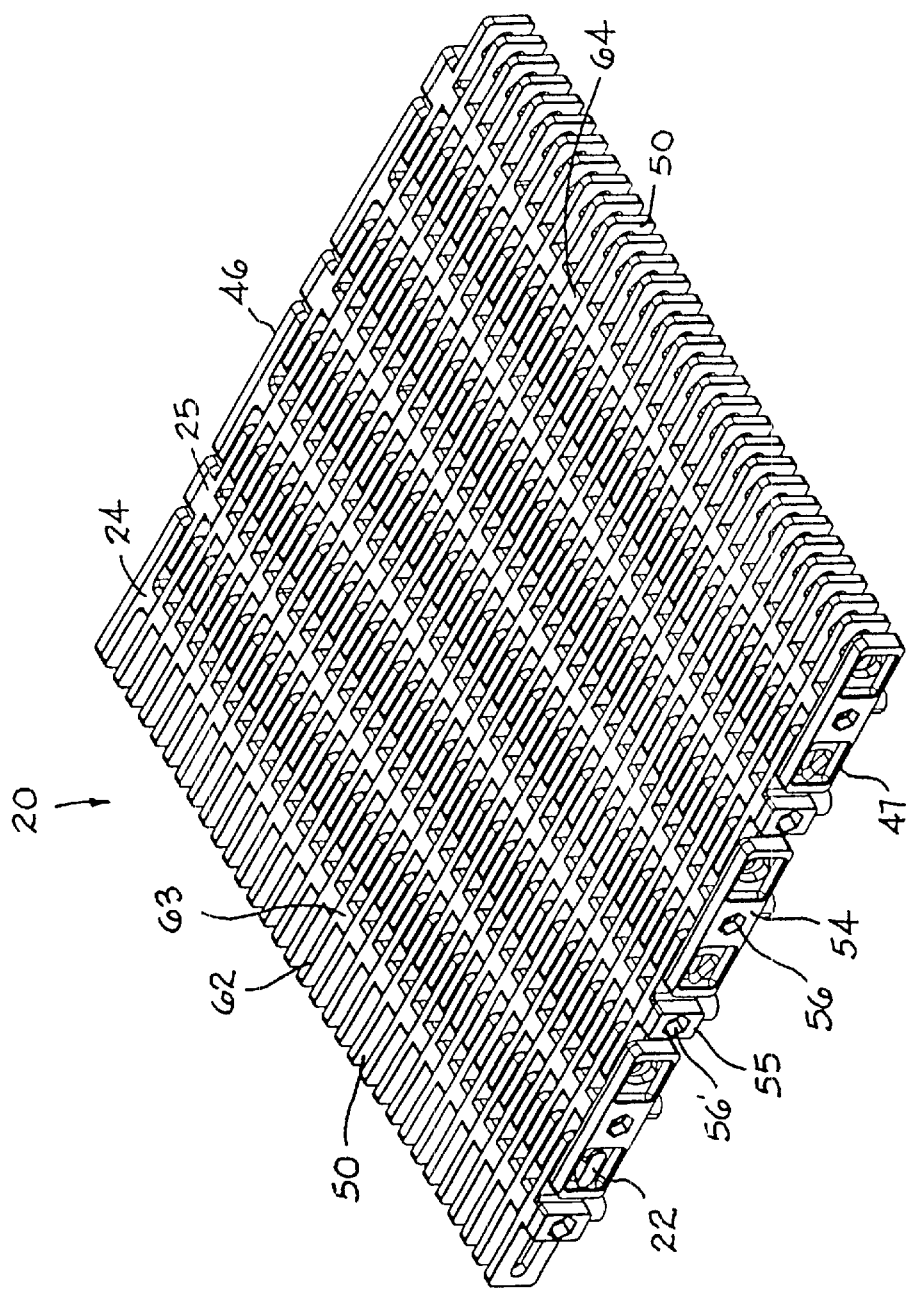
FIG. 1B is a partial top perspective view from a second edge of the belt of FIG. 1A on straight path.

Portions of an exemplary version of a radius belt 20 having features of the invention are shown negotiating a turn in FIG. 1A and a straight in FIG. 1B. The endless belt is composed of a succession of belt rows, preferably made of injection-molded plastic, connected end to end by pivot rods, or hinge pins 22. In the version shown, there are two styles of belt rows: a first row 24 and a second row 25. The first row comprises a first set 26 of hinge elements along a first end 28 of the row and a second set 27 of hinge elements along an opposite second end 29 of the row. An elongated slot 30 is formed in each of the first and second hinge elements of the first row. The slots at each end are axially aligned across the width of the belt and are elongated in the direction of belt travel. The first and second sets of hinge elements extend from a central portion 32 forming a transverse connecting member across the width of the row. The second row 25 comprises a first set 34 of hinge elements along a first end 36 and a second set 35 of hinge elements along a second end 37. A fan-shaped aperture 38 is formed in each of the first and second hinge elements 34, 35 in axial alignment along each end of the row. The fan shape is characterized in a preferred version by a rounded vertex 40 at the distal ends of the hinge elements farming or flaring out along an approximately 60° sector along a radius 41 at the proximal ends of the hinge elements. The hinge elements extend from a central portion 42 forming a transverse connecting member similar to that of the first row.

The second set of hinge elements of a first row are interleaved with the first set of hinge elements of an adjacent second row whose second set of hinge elements are interleaved with the first set of hinge elements of another first row and interconnected by hinge pins 22 inserted in the aligned slots 30 and apertures 38 between rows to form a belt 20.

Each row can be constructed of a single integral belt module molded to width or individual side-by-side modules including one or more hinge elements at each end in a bricklaid or a continuous-seam configuration. In the version shown in the drawings, each row comprises a stack of individual links 48, 49, better shown in FIGS. 6 and 7. In FIG. 6, each link 48 on the first row 24 includes a first hinge element 26 and a second hinge element 27 extending from a central portion 32 acting as a spacer to provide a gap 50 (as shown in FIG. 1A) between hinge elements along each end of the row. The central portion 32 includes a bore 44 to admit a support element 45, such as a threaded rod or a bolt, on which a plurality of links 48 can be stacked side by side to form the row. For better stacked alignment, a boss 86 extends from the central portion to mate with a boss receptacle (not shown) on the other side of the link. Fastener hardware 52, such as washers, nuts, and bolts heads, are used to retain the stacked links into a sturdy belt row. The links 49 of the second row 25 are similarly formed and joined to construct the second row, as shown in FIG. 7.

Special edge links can be used to give the belt a somewhat flush edge less likely to snag nearby objects. A first nut-capturing edge link 54 (shown in FIGS. 1B and 9) is used at the edge 47 of the second row 25. The edge link includes a hexagonal recess 56 for a nut that threads onto an end of the support element 45. The fan-shaped apertures 38 are also recessed into the first edge piece 54 to prevent the end of the hinge pin from protruding beyond the belt edge. A second nut-capturing edge link 55 contains a similar recess 56' for the edge of the first belt row 24. As shown in FIG. 1A, the opposite second edge 46 of the belt is terminated in edge links 58, 59 including recesses 60, 60' for bolt heads. The first row is terminated in an edge link 58 with a round recess 60 for the head of a bolt used as the support element. The first row edge link also recesses the slots 30 to prevent the end of the hinge pin from projecting beyond the edge of the belt. The second row terminates in an edge link 59 that has a similar recess 60' for a bolt head. These modular pieces allow a custom belt of any width to be constructed easily.

Figure 2A:
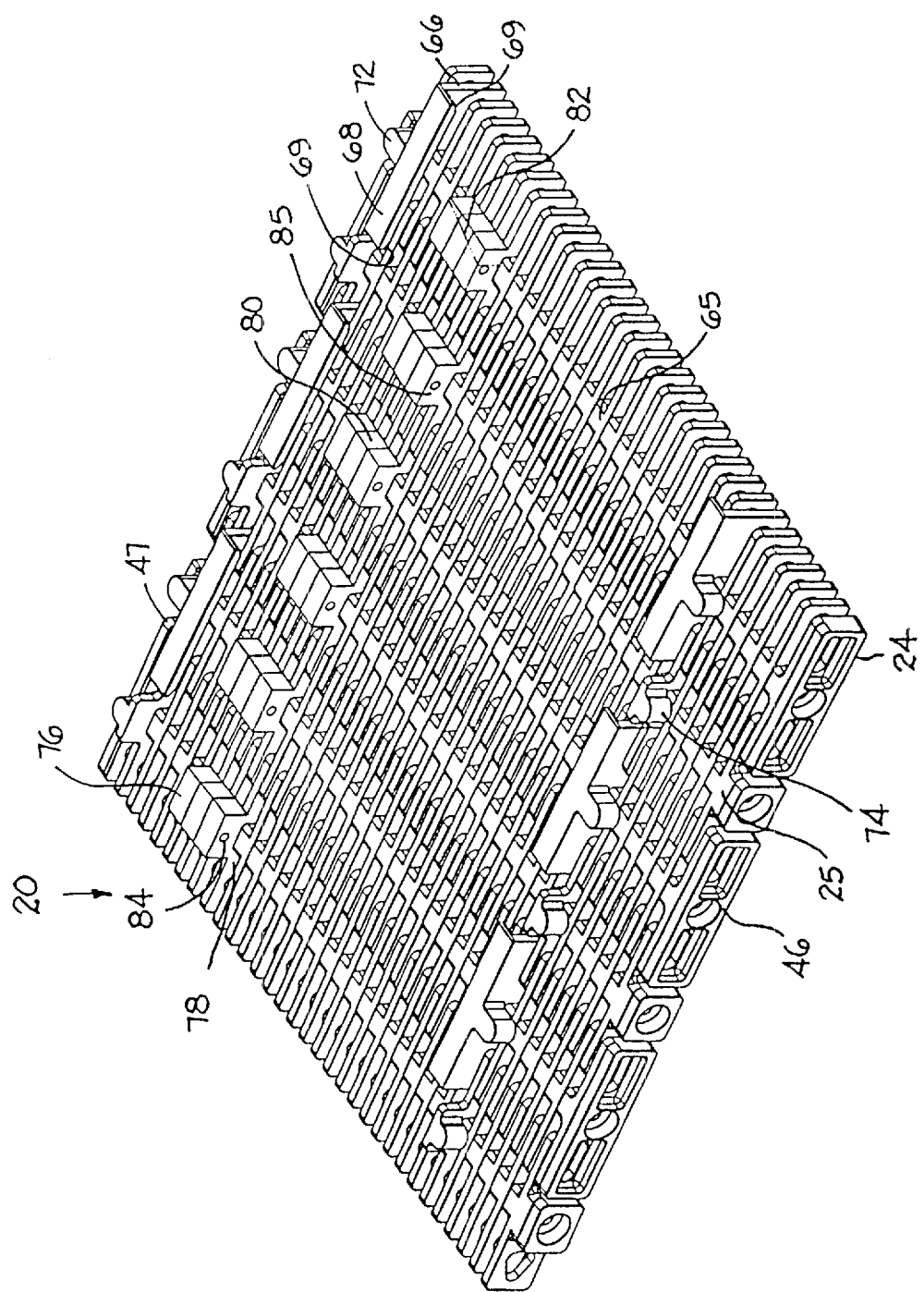
FIG. 2A is a partial bottom perspective view from the first edge of the belt of FIG. 1A in a turn.
Figure 2B:
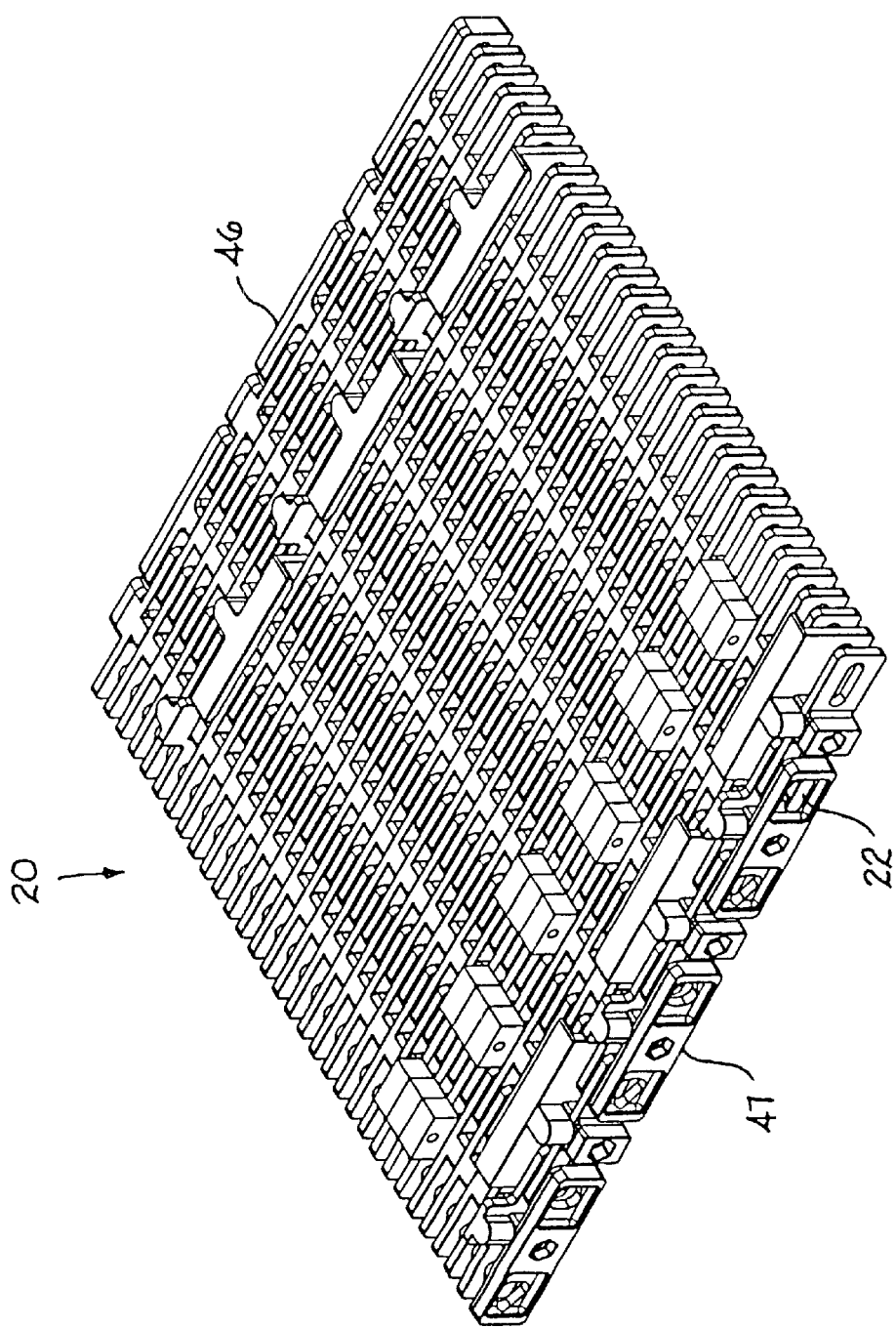
FIG. 2B is a partial bottom perspective view from the second edge of the belt of FIG. 1A on a straight.
Figure 8:
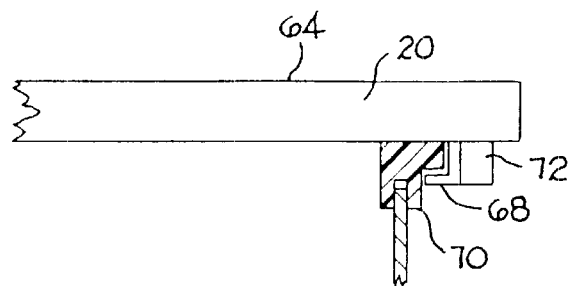
FIG. 8 is a partial elevation view of the belt of FIG. 2A engaging a wearstrip at the outside of a turn.

As shown in FIGS. 1A and 1B, the top surfaces 62 of the hinge elements 26, 27, 34, 35 and the top surfaces 63 of the central portions 32, 42 form a top article-conveying belt surface 64, which is generally planar for product stability. (The top surfaces 63 of the central portions could alternatively be recessed.) The bottom side of the belt, as shown in FIGS. 2A and 2B, can include a number of features. The features can be integrally molded as part of each row or can be, as shown in FIGS. 2A and 2B, part of an individual special-purpose link. FIG. 2A shows a special holddown link 66 in the first row 24 of the belt. The hinge elements 26, 27 extend downward from the bottom side 65 of the belt a distance and terminate in a horizontal flange 68 with sloped leading and trailing ends 69. The flange engages a wearstrip 70 (FIG. 8) at the outside of a turn to hold the belt down so that it does not flip up. The holddown link also includes a tooth 72 projecting outward from the extended hinge elements on the bottom side of the belt. The teeth project toward the outer side edge of the belt for engaging a mating drive belt or sprocket (not shown) or a trolley gear as might be used in a first-in, first-out article accumulating system. Another tooth link 74, without holddown flanges, includes only the tooth 72. Left- and right-hand links performing similar functions make up the set of links needed for complete versatility in constructing a custom belt.

As already mentioned, the belt can be driven from the side by engagement with the teeth 72 or by an intermediate caterpillar-type drive engaging lugs 76 extending from the bottom surface 65 of the belt. The lugs can be formed in individual links 78 in the form of a box and grouped together as shown in FIGS. 2A and 2B to provide extra drive area. The lugs provide a drive surface 80 engaged by the driving surfaces, such as cogs or roller wheels, of an intermediate drive belt or chain. As shown in the drawing, the drive surfaces are parallel to the width of the belt, but could also be at an angle 82 to facilitate engagement of the lug drive surface by a driving surface, especially where belt pitch may be varying because of changes in temperature, wear, loading, and manufacturing variations. The lugs shown also include aligned holes 84 to accept a press-fit pin 85 to fortify the side by side lugs. (Such a pin would be unnecessary in an integrally molded belt.)

Figure 5A:
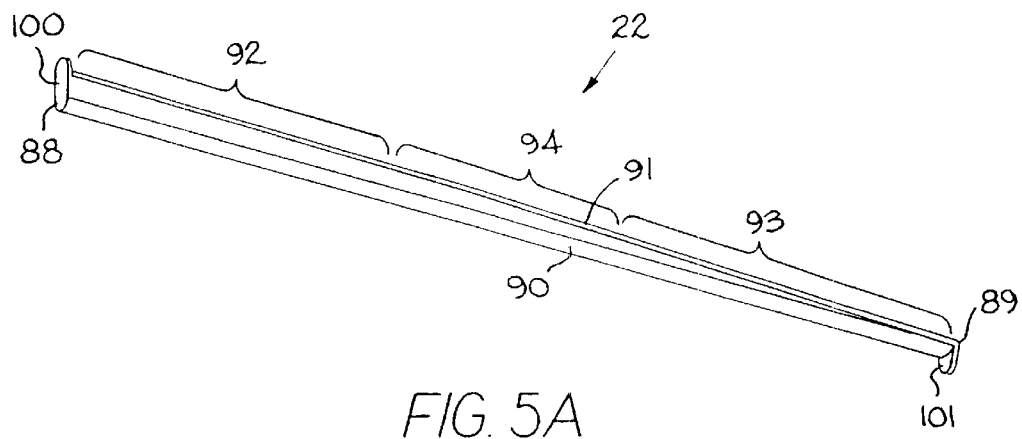
FIG. 5A is a perspective view of one version of the tapered oblong hinge pin of FIG. 1A.
Figure 5B:
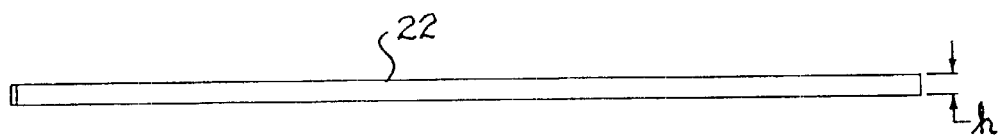
FIG. 5B is a rear elevation view of the hinge pin of FIG. 5A.
Figure 5C:
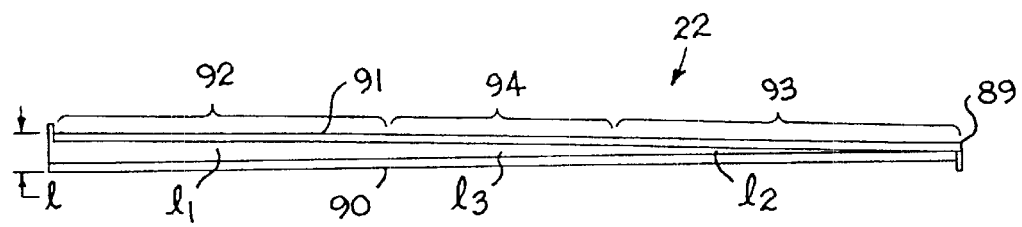
FIG. 5C is a top plan view of the hinge pin of FIG. 5A.

As shown in FIGS. 5A–5C, the preferred version of the hinge pin 22 has a tapered oblong shape. The pin extends from a wider first pin end 88 to a narrower second pin end 89. The pin preferably has a constant height h along its length. The pin extends in the direction of belt travel from a front surface 90 to a rear surface 91. The front 90 is straight along the length of the hinge pin. The rear is straight across a first region 92 to give a constant cross section throughout the first region, which extends from the first end 88 of the pin toward the second end 89. The rounded front and rear surfaces give the pin a generally oval cross section. The rear of a second region 93, which extends from the second end of the pin toward the first end, is tapered toward the second end so that the long axis l of the cross section, i.e., the distance between the front 90 and rear 91 of the pin increases with distance from the second end to a maximum $l_2$ less than or equal to the long axis $l_1$ of the cross section of the first region 92. In a preferred version, the long axis $l_2$ of the second region varies linearly with distance from the second end.

Figure 3A:
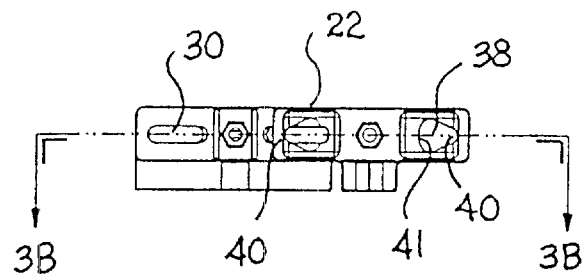
FIG. 3A is a side elevation view of two rows of the conveyor belt of FIG. 1A on a straight path.
Figure 3B:
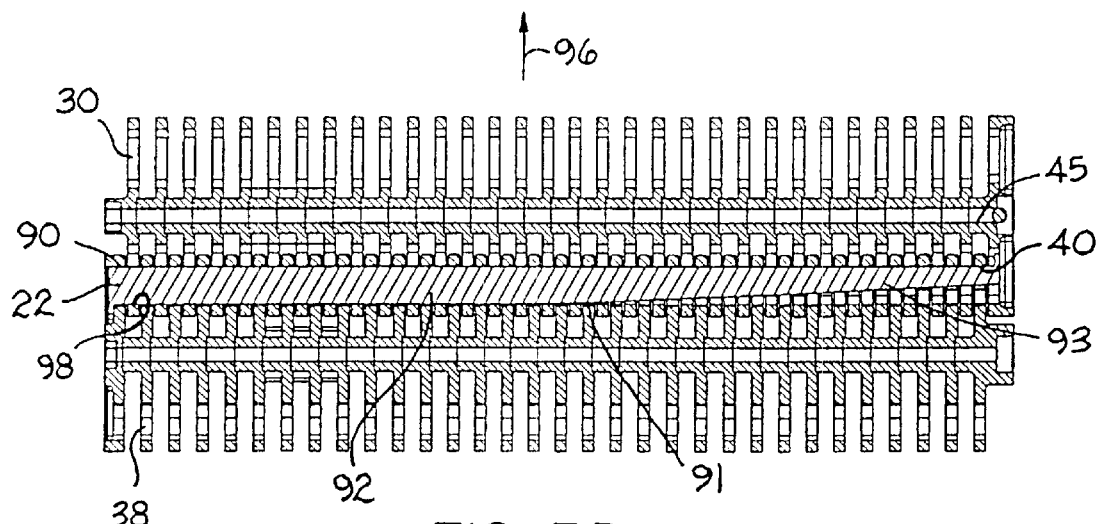
FIG. 3B is a cutaway cross section of the two rows of FIG. 3A.

As the belt runs on a straight path, as shown in FIGS. 3A and 3B, in the direction of arrow 96, the front 90 of the hinge pin 22 is pulled tightly against the mating vertices 40 of the fan-shaped apertures 38 by the tension in the belt. The rear 91 of the first region 92 of the hinge pin is pulled tightly against the distal end 98 of the slots 30 encompassing the first region. The rear of the second region 93, however, is spaced from the distal ends of the slots 30 because of its tapering rear. Consequently, belt tension is shared among the hinge elements encompassing the first region of the hinge pin on a straight run.

Figure 4A:
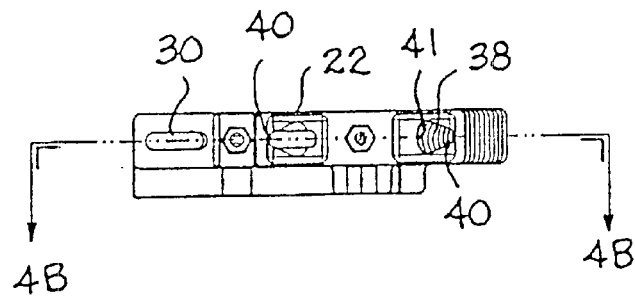
FIG. 4A is a side elevation view of two rows of the belt of FIG. 1A at the inside of a turn.
Figure 4B:
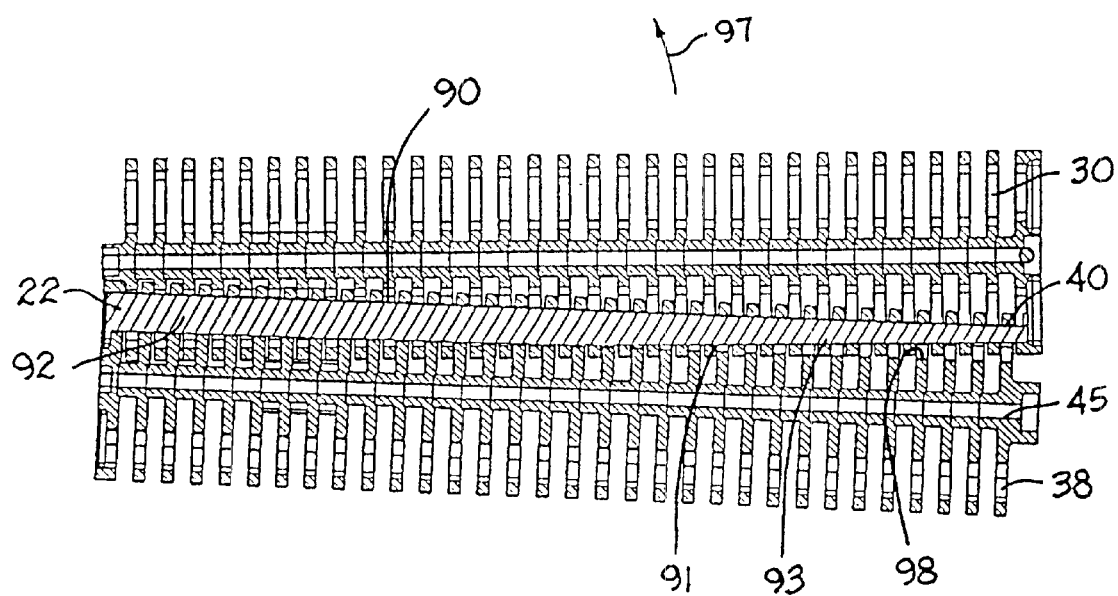
FIG. 4B is a cutaway cross section of the two rows of FIG. 4A.

In a turn, as shown in FIGS. 4A and 4B, in the direction of curved arrow 97, as in a straight, the front 90 of the hinge pin is pulled tightly against the mating vertices 40 of the fan-shaped apertures by belt tension. The rear 91 of the second region 93 of the hinge pin is pulled tightly against the distal ends 98 of the slots 30 encompassing the second region. The tapered second region defines the changing pitch of the belt across its width as it fans out at its outer edges in a turn. The pitch of the belt decreases from the outside of the turn inwardly as defined by the long axis $l_2$ of the cross section of the second region. The rear of the first region 92 is spaced from the distal ends of the slots in the hinge elements encompassing the first region of the hinge pin owing to the collapse of the rows into each other at the inside of the turn. Thus, only the hinge elements encompassing the second region of the pin share the belt tension in a turn.

In a preferred version of the hinge pin shown in FIG. 5C, an intermediate third region 94 forms a transition from the first 92 to the second 93 region. The long axis $l_3$ of the cross section of the third region varies from the maximum long axis $l_2$ of the cross section of the second region to the constant long axis $l_1$ of the cross section of the first region. The variation in $l_3$, as that for $l_2$, can be linear or follow any other monotonic relationship that allows the tensile load to be transferred smoothly from the inner links to the outer links through the interior links as the belt enters a turn and vice versa as it exits a turn. In this way, the tapered oblong hinge pin allows for a strong belt without the need for oversizing it for radius applications. To achieve the unique shape of the hinge pin, it is preferably manufactured by injection molding, but could alternatively be machined.

In order for the belt to articulate about a drive sprocket or to enter or exit an inclined conveying path, the belt must be able to pivot at the hinge between consecutive rows. The shape of the hinge pin 22 residing in the slots 30 does not allow the pin to rotate relative to the slots. The fan-shaped apertures 38 in the hinge elements interleaved with the slotted hinge elements include a wider sectorial portion along a proximal surface 41, which could be a radial surface. The length of the radius from the vertex 40, in which the front of the hinge pin 22 is nested, is just slightly greater than the long axis 11 of the first region 92 of the hinge pin. The sectorial portion allows the hinge pin and the interleaved slotted link row to pivot about the row with fan-shaped apertures both up and down according to the vertex angle of the aperture. The fan-shaped apertures allow forward- and back-flexing of a belt using an oblong hinge pin. The fan-shaped aperture could alternatively have a more triangular shape, in which case the proximal surface 41 would be straight instead of curved. The sectorial portion need not be symmetric about the hinge pin's position on level runs. If the belt is not required to backflex, for example, the sectorial portion needs to extend only downwardly from a horizontal plane containing the vertex to allow the belt to articulate about a sprocket.

The version of the hinge pin 22 shown in FIGS. 5A–5C includes end tabs 100 and 101. The first end tab 100 extends outward from the rear 91 of the pin of the first end 88, and, as shown in FIG. 9, engages the link wall 102, such as on a nut-retaining edge link 54 to prevent the pin from entering the aligned openings further. The second end tab 101 extends outward from the front 90 of the pin at the second end 89. To insert the pin between two belt rows, the rows are first collapsed and the second, narrower end of the pin inserted with the front 90 of the pin sliding along the vertices 40 of the fan-shaped apertures 38 until the pin is fully inserted. The second end tab 101 is deflected as it slides through the aligned opening until it snaps into its original position in the gaps 50 between hinge elements. When the hinge pin is fully inserted, the second end tab 101 is retained by wall structure proximate the vertex 40 of a fan-shaped aperture near the second edge of the belt. In this way, the tabs prevent the hinge pin from working out of the belt during operation. Of course, many pin retention schemes are known in the art. The hinge pins could be tables, and integral belt structure or other insertable occlusions could be used to retain a hinge pin providing the load-sharing advantages of the invention.

Figure 10:
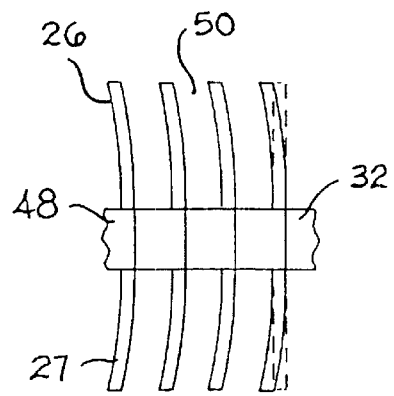
FIG. 10 is a partial top plan view of a belt row of the belt of FIG. 1A.

As shown in FIG. 10, the hinge elements 26, 27 of a row can be arranged along a radius approximating the turning radius of the belt rather than along straight lines perpendicular to the transverse connecting member. This provides extra strength in a turn and allows the belt to negotiate tighter turns. The gaps 50 between consecutive hinge elements are spaced wide enough to accommodate the interleaved radially aligned hinge elements of the adjacent row on straight runs.

Another version of the belt having features of the invention is exemplified by the link structure of FIG. 11. The hybrid link 104 includes a pair of hinge elements 106, 107 extending from a central portion 108 similar to the links of FIGS. 6 and 7. The central portion includes a bore 44 through the center of the central portion and a boss 86 for engaging with a boss receptacle on the opposite side of a similar link. Unlike the links of FIGS. 6 and 7, the link 104 has a slot 30 in a first hinge element 106 and a reversed fan-shaped aperture in a second hinge element 107. Links such as these can be stacked on a support element through the bore to form a row of links that can be mated with a similar row of links to form an endless belt that accommodates the tapered oblong hinge pin 22 and provides performance on straight and curved conveyor belts similar to that of the belt of FIG. 1A. The hinge elements could also be staggered, or offset, from one another, rather than in-line as shown. Furthermore, the hinge elements could attach to the central portion at positions other than along one end and still provide the advantages of the invention.

Figure 13:
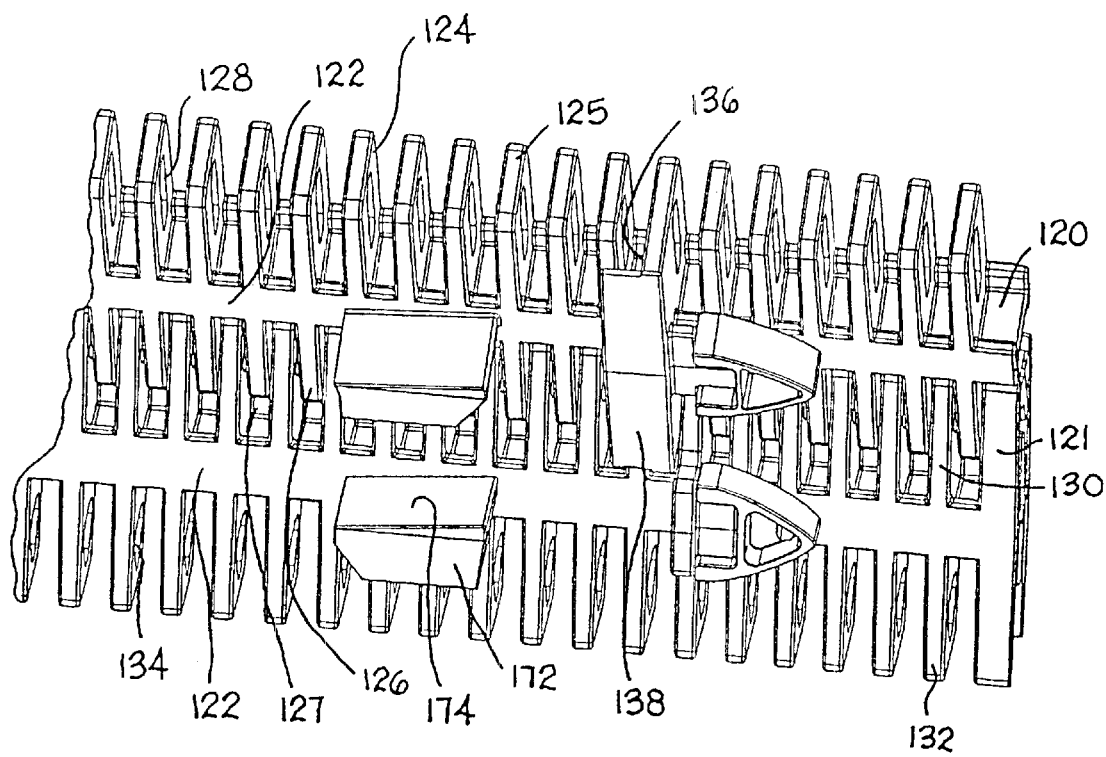
FIG. 13 is a partial bottom perspective view of two generally molded belt modules usable in the conveyor belt as in FIG. 1A.

An integrally molded belt module generally replicating a stacked set of the links 104 is shown in FIGS. 13–15 and 20. The module 120 of FIG. 13 includes a transverse connecting member 122, shown in the form of an I-beam, from which a first set of hinge elements 124 extends to a first end 125 of the module and from which a second set of hinge elements 126 extends to a second end 127. As shown in FIG. 13, both sets of hinge elements include aligned elongated slots 128 to accommodate a tapered hinge pin. The other module 121 shown in FIG. 13 is generally similar to the module 120 of FIG. 13. One difference is that the hinge elements 130, 132 of the module 121 include aligned fan-shaped apertures 134 to allow a belt made of alternating rows of modules 120 and modules 121 to flex about the hinge formed between consecutive rows. Just as for the stacked links, each module could alternatively have slots through one set of hinge elements and fan-shaped apertures through the opposite set. To achieve flexing, a set of hinge elements on one row having slots interdigitate into a set of hinge elements having fan-shaped apertures on an adjacent row.

Figure 14:
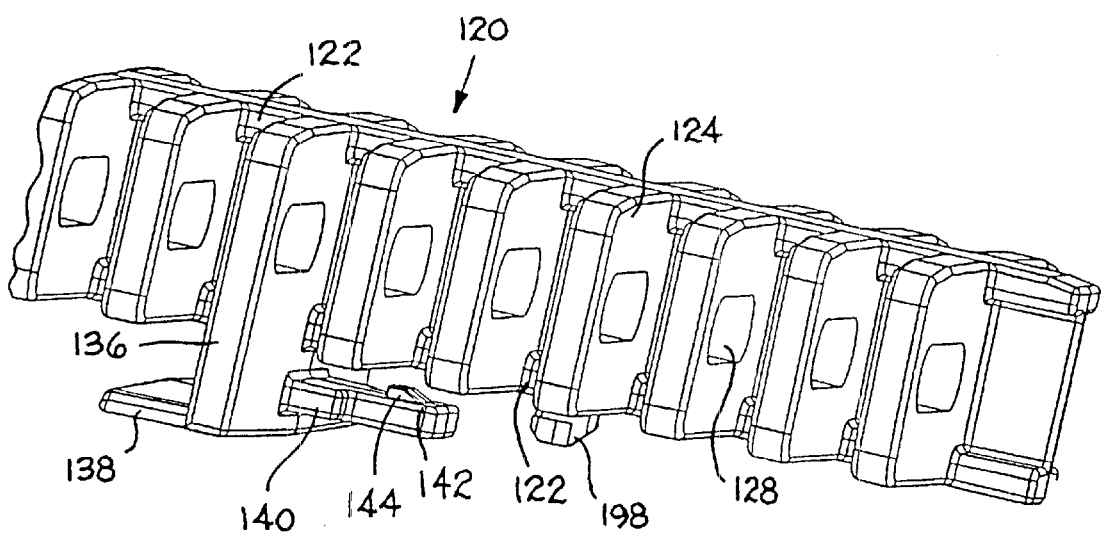
FIG. 14 is a partial front perspective view of one of the modules of FIG. 13.
Figure 15:
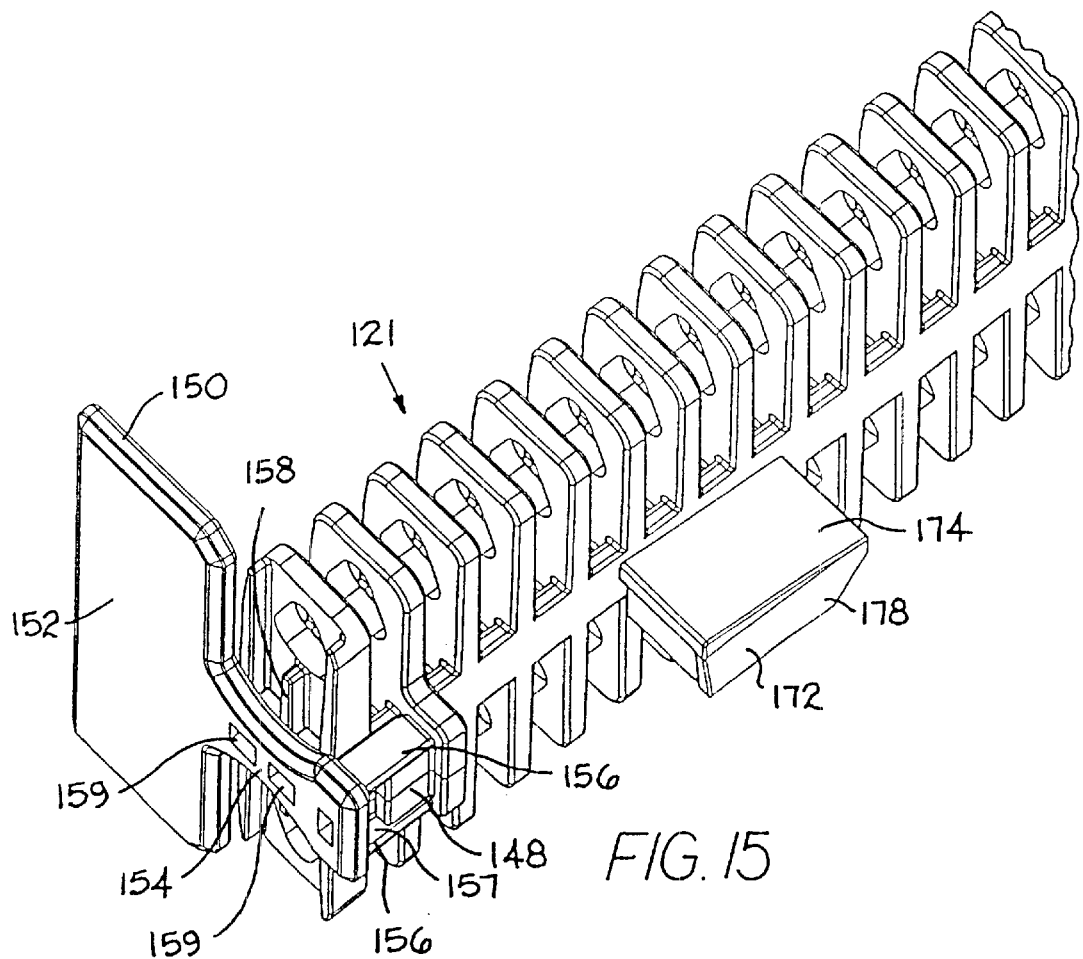
FIG. 15 is a bottom perspective view of a snap-on sideguard with one of the modules of FIG. 13.

The modules of FIG. 13 have other features useful in conveyor applications. Depending from the bottom of one pair of opposite hinge elements 124, 126 is an integrally molded vertical extension 136 terminating in a horizontal flange 138 forming a holddown tab to engage a wearstrip 70 (FIG. 8) in the outside of a turn to hold the belt down. As shown in FIG. 14, the vertical extension. The mounting tab includes retention structure 142 in the form of a raised trapezoidal element 144 between the top of the mounting tab and the transverse connecting member 122. The accessory mounting tab allows various accessories to be snapped onto the belt module and easily replaced as they wear. A vertical extension 146 without a horizontal flange is shown near a side edge of a module 121 in FIG. 15. The extension does not extend longitudinally as far as the holddown extension 136. It does include a similar accessory mounting tab 148.

An example of one accessory that can optionally be added to the module is a side guard 150. The side guard includes a vertical plate 152 extending from a stem 154. At the bottom of the stem, a pair of retention tabs 156, each with a receptacle 157, extend horizontally to mate with the mounting tab 148 at the side edge of the belt. Once snapped in place, the side guard prevents conveyed products from falling off of the side of a belt constructed of modules so equipped. Stubs extending from snap-in structure 158 at the side edge of the belt snap into engagement with undercut surfaces recessed in openings 159 in the side guard to help retain it in place.

Figure 16:
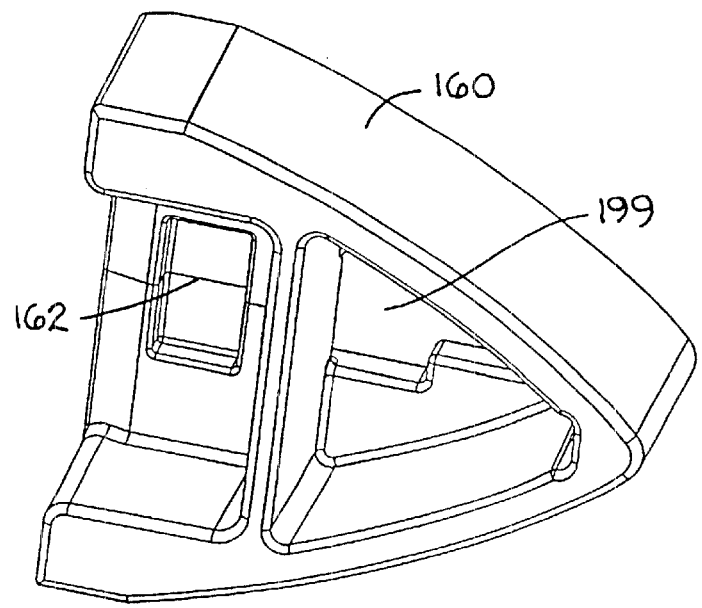
FIG. 16 is a bottom perspective view of a snap-on tooth usable with the modules of FIG. 13.
Figure 17:
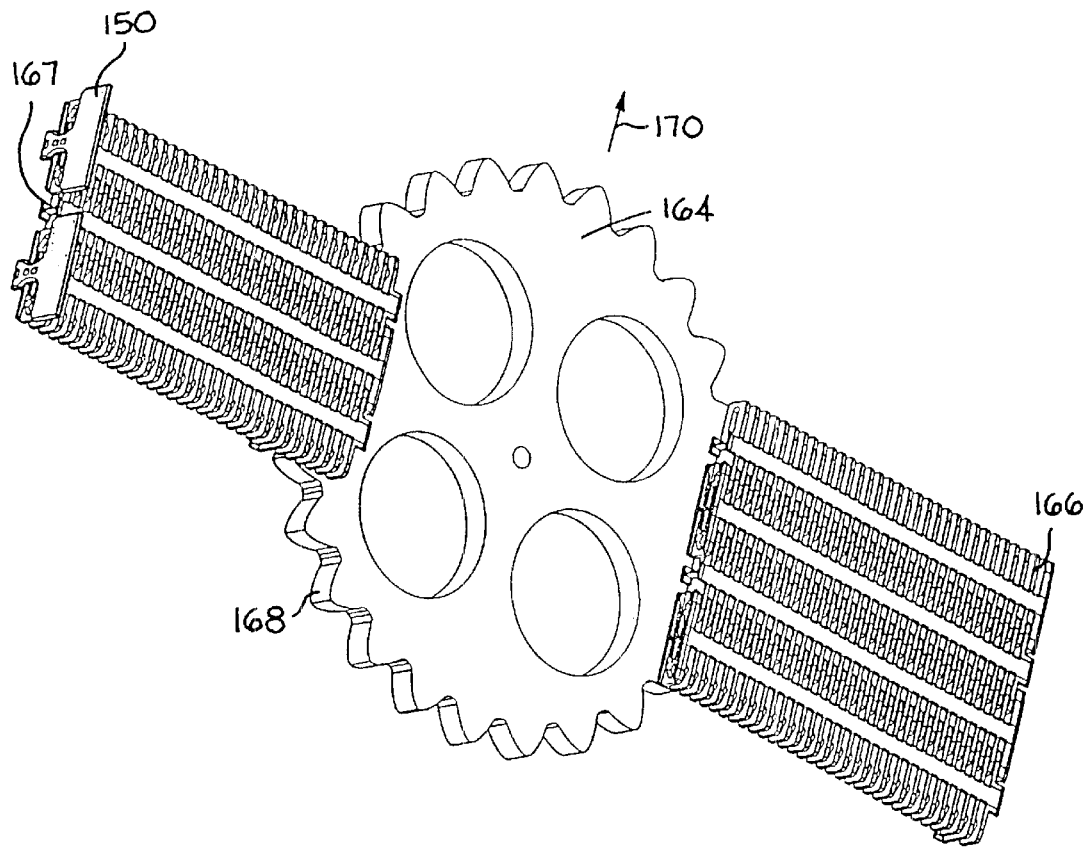
FIG. 17 is a top plan view of two belts according to the invention driving a product transfer spider wheel in a product-accumulating application.

Another accessory that can snap onto the accessory mounting tabs 140, 148 is a tooth 160 as shown in FIG. 16. The tooth shown in spade-shaped and has built-in receptacle 162 for receiving the trapezoidal element 144 of the mounting tab. Although the tooth can be used as a drive surface that can be driven by a horizontal drive sprocket wheel, it can also be used to engage and drive a spider wheel gear 164, as shown in FIG. 17, geared between two strands 166, 167 of conveyor belting made of the modules of FIGS. 13–15. (The spider wheel could, of course, be used with the belts made of stacked links 104.) The spider wheel includes gear teeth 168 that mesh with the teeth 160 of the belts. In the application shown in FIG. 17, the spider wheel is used in a product accumulation system. If the input strand 166 is running faster than the output strand 167, the spider wheel rotates and moves in the direction of arrow 170 to allow product to accumulate on longer stretches of belt. The spider wheel includes a scraper assembly (not shown) to divert product from the input strand across the spider wheel to the output strand. When the output strand moves faster, the spider wheel moves in the direction opposite arrow 170 to shorten the accumulation zone. When both strands move at the same speed, the spider wheel merely rotates in place.

Also extending from the bottom of the modules 120, 121 is an integrally molded drive lug 172. The lug includes a vertical drive surface 174 supported by struts 175 (in FIG. 13) joined by a plate 178. The lug could equivalently be solid, but generally does not require so much extra material because the struts and plate give it enough strength without more mass than necessary. Although the drive surface could be parallel to the transverse connecting member 122, it is preferably oriented obliquely to the connecting member at an angle A. Furthermore, the drive surface could be angled off vertical. For example, the drive surface could be sloped from the bottom of the modules rearwardly to provide means for engaging cogs to hold the belt down.

Figure 18:
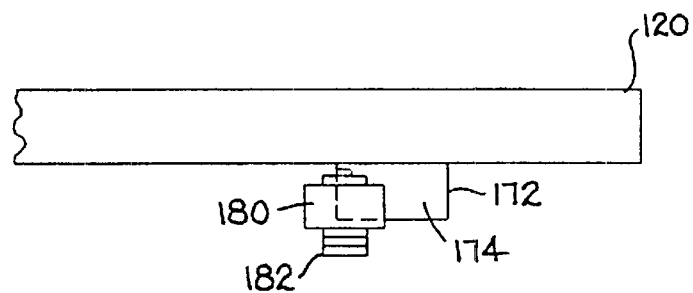
FIG. 18 is a partial end elevation view of one link of an intermediate drive chain with rollers engaging the drive lugs of a belt constructed of the modules of FIG. 13.
Figure 19:
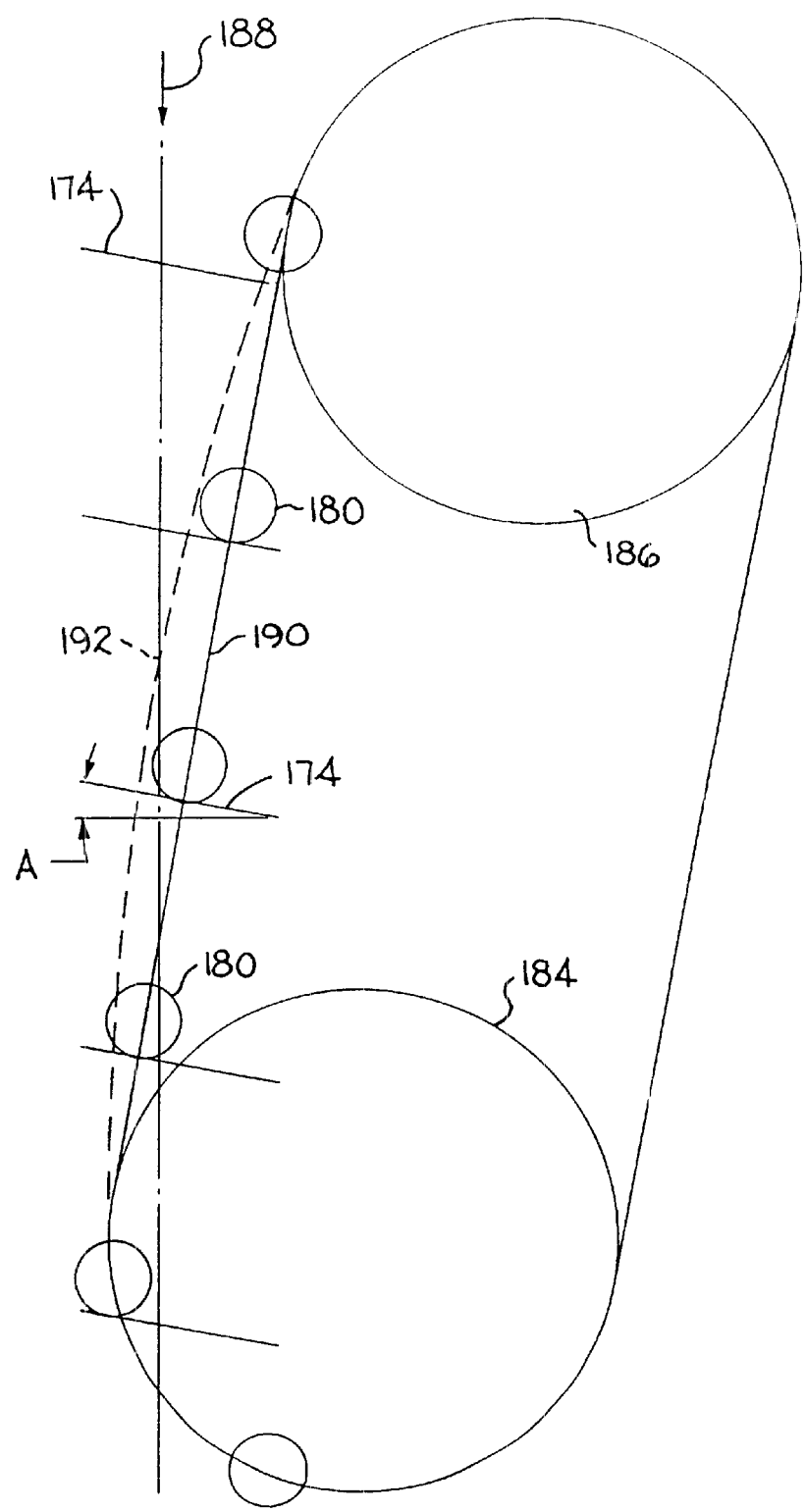
FIG. 19 is a schematic diagram illustrating the intermediate drive relationship of the drive chain rollers and the drive lugs.

A belt made of the modules or links of the invention can be driven by cogs engaging the drive surfaces, by the threads of a worm gear, or, as shown in FIG. 18 and schematically represented in FIG. 19, by rollers 180 of a roller chain 182. The roller chain forms an intermediate drive that is driven by a motor (not shown) rotating a horizontal drive sprocket 184. An idler sprocket 186 loops the chain back to the drive sprocket.

It has been found that superior driving results can be achieved by angling the drive surfaces 174 of the belt from the transverse direction of the belt and by using a roller chain whose path is roughly perpendicular to the drive surfaces along an effective driving length of the belt. This relationship is shown schematically in FIG. 19. The drive surfaces 174 are shown angled with respect the direction of belt travel 188. The drive chain 182 is shown following a path perpendicular to the drive surfaces. Because the pitch of the belt tends to vary because of temperature changes, wear, loading, and manufacturing variations, it is difficult to drive effectively with a fixed pitch drive chain running in the same direction as a belt with drive surfaces transverse to belt travel, as is conventionally done. In such a conventional scheme, one drive surface typically carries all the load without sharing it among other drive surfaces. This results in earlier belt failure. With the scheme shown in FIG. 19, variations in belt pitch are accommodated by the angled orientation of the drive surfaces, which allows each roller 180 to ride along the drive surface to a point at which each roller is driving the belt. As the drive chain 182 comes away from the drive sprocket 184 or enters the idler sprocket 186, its angle of attack is much steeper to allow for an unobstructed entry into an exit from driving engagement with the drive surfaces. Although a linear 190 drive path for the chain in the drive region is effective and simple to construct, a curved chain drive path 192, as seen in phantom in FIG. 19, bowed slightly outwardly from the linear path, could provide even better performance.

Figure 20:
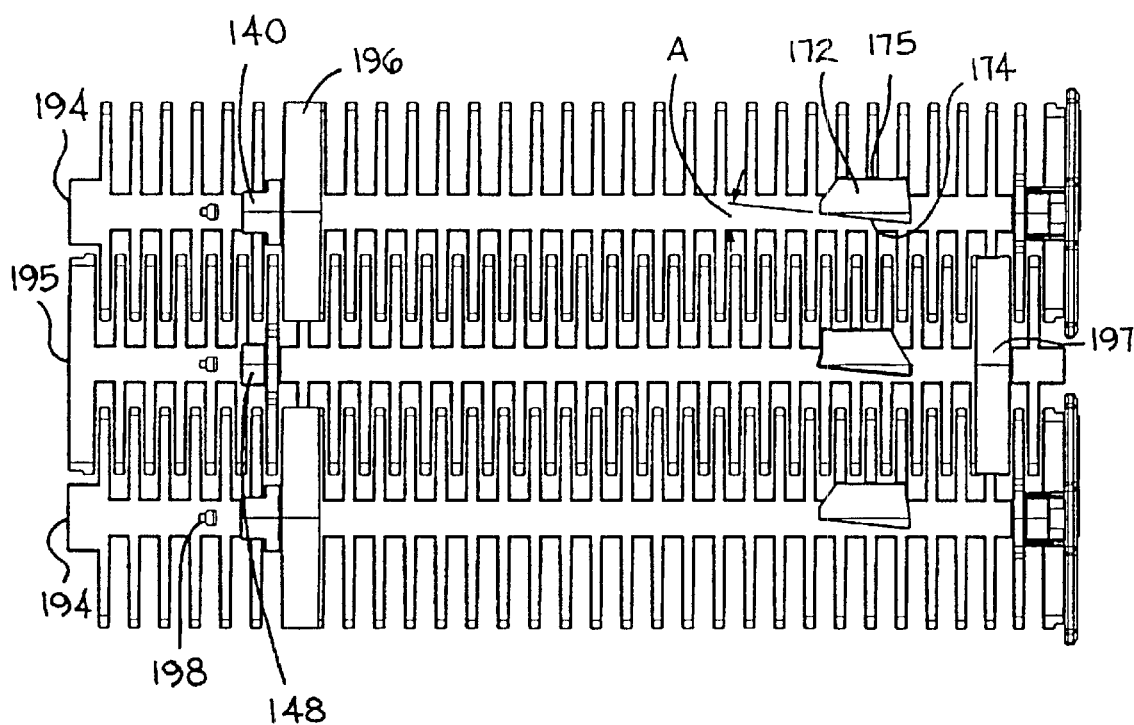
FIG. 20 is a bottom plan view of another version of three belts rows constructed of integrally molded modules usable in a conveyor belt as in FIG. 1A.

A bottom view of three rows of a slightly different version of a belt constructed of integrally molded modules is shown in FIG. 20. Besides showing the oblique angle A of the drive surfaces 174 of the drive lugs 172, FIG. 20 shows a feature that allows for easy replacement of modules while the belt is still in the conveyor frame. A first belt row 194 has single holddown tab 196 at the left side of FIG. 20. A successive second belt row 195 has a single holddown tab 197 at the right side. By alternating the holddown tabs from side to side row by row, one can remove a single row from the belt without having to slide the belt row to be removed off an end of the belt support as would be required if holddown tabs were formed on both sides of each row. It would also be possible to have some rows without holddown tabs at all.

The rows 194, 195 could also include accessory mounting tabs 140, 148 (as in FIGS. 14 and 15) for attaching, for example, a tooth, such as the tooth 160 in FIG. 16. Each row could also include a raised T-shaped accessory support 198 to hold a tooth attached to the accessory mounting tab in position. Complementary receiving structure 199 on an accessory tooth is engaged by the accessory support 198, which inhibits the tooth from pivoting out of position as it engages a mating gear wheel.

Figure 12:
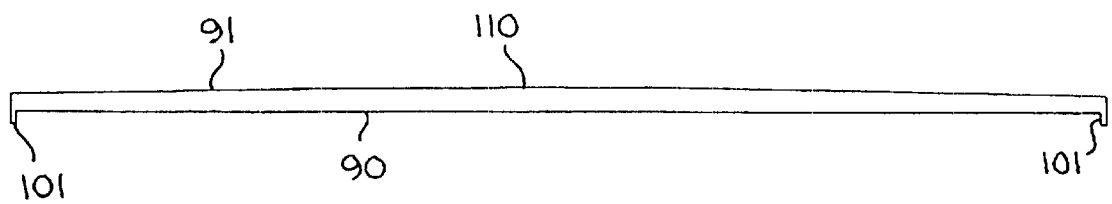
FIG. 12 is a top plan view of another version of oblong hinge pin useful in bilateral turning belts in accord with the invention.

The top plan view of another version of the hinge pin is shown in FIG. 12. The hinge pin 110 is generally a dual-sided version of the pin 22 of FIGS. 5A–5B. Inserted into the aligned openings of a conveyor belt as in FIG. 1A, the bilateral hinge elements at the outside of the turn on curved conveyor paths and by the middle hinge element on a straight run.

Although the invention has been described in detail with reference to preferred versions, other versions are possible. For example, the belt can be made of materials other than injection-molded thermoplastics—metals, ceramics, and machined plastics being other examples. The hinge pin could be metal, plastic, fiberglass, or other material, and could be molded, cast, or machined. As mentioned previously, each row could be constructed of a set of stacked links or could be integrally formed with the central bore and support element eliminated. Therefore, as these examples suggest, the spirit and scope of the claims should not be limited to the descriptions of the preferred versions.

What is claimed is:

1. A modular conveyor belt suitable for conveying product in a direction of travel that may include a curved path, comprising:

a plurality of successive rows of belt modules, each row extending in the direction of travel from a first end to a second end and extending across the width of the belt from a first side edge to a second side edge, each row including hinge elements at the first end and the second end of the row, the hinge elements at the first end of one row being interleaved with the hinge elements at the second end of a successive row and forming openings axially aligned to provide a passageway for a hinge pin through the hinge elements across the width of the rows to form a hinge between successive rows, wherein at each hinge the hinge elements of one of the rows circumscribe slots therethrough elongated in the direction of belt travel and the interleaved hinge elements of the successive row form fan-shaped apertures extending from a vertex at the distal ends of the hinge elements to a proximal surface at the proximal ends of the hinge elements; and a plurality of oblong hinge pins extending through the aligned slots and fan-shaped apertures of interleaved hinge elements at each hinge to hingedly line successive rows into a conveyor belt;

wherein each oblong hinge pin comprises a first region and a second region and has an oblong cross section with a long axis in the direction of belt travel, the first region extending from the first end toward the second end and characterized by a generally constant oblong cross section, the second region extending from the second end toward the first end and characterized by a tapered oblong cross section, the long axis of the cross section of the tapered second region in the direction of belt travel increasing with distance from the second end of the pin toward the first region to share belt tension among hinge elements encompassing the second region of the hinge pin near the second side edge of the belt at the outside of a turn and among hinge elements encompassing the first region of the hinge pin at the first side edge of the belt in straight conveyor paths.

2. A modular conveyor belt as in claim 1 wherein the hinge pin further comprises a third region between the first region and the second region, the long axis of the cross section of the third region varying monotonically with distance from the first region to the second region to provide a transitional sharing of belt tension among hinge elements encompassing the third region as the belt transitions between straight and curved paths.

3. A modular conveyor belt as in claim 1 wherein the cross section of the hinge pin is generally oval in shape.

4. A modular conveyor belt as in claim 1 wherein the hinge pin in the second region is tapered linearly with distance from the second end of the hinge pin.

5. A modular conveyor belt as in claim 1 wherein the oblong hinge pin extends in the direction of belt travel from a front surface to a rear surface and wherein the vertices of the fan-shaped apertures nest the front surface of the hinge pin.

6. A modular conveyor belt as in claim 1 wherein each belt row includes a plurality of link elements comprising a central portion and first hinge element and a second hinge element extending in opposite directions from the central portion.

7. A modular conveyor belt as in claim 6, wherein the central portion of each link element circumscribes a transverse bore to accommodate a support element therethrough for stacking a plurality of link element to form a belt row.

8. A modular conveyor belt as in claim 1 wherein the hinge elements extend along a turning radius or the belt.

9. A modular conveyor belt as in claim 1 wherein the successive rows comprise alternating first rows and second rows and wherein the hinge elements of the first rows circumscribe slots and the hinge elements of the second rows form fan-shaped apertures.

10. A modular conveyor belt as in claim 1 wherein the hinge elements of the first ends of the successive rows circumscribe slots and the hinge elements of the second ends of the successive rows form fan-shaped apertures.

11. A modular conveyor belt as in claim 1 wherein the proximal surfaces of the fan-shaped apertures are radial surfaces about the vertices of the apertures.

12. A modular conveyor belt as in claim 1 further comprising a mounting tab extending from the bottom of a belt row for attaching accessories to the bottom of the belt.

13. A modular conveyor belt as in claim 1 further comprising a plurality of drive lugs including vertical drive surfaces extending from the bottom of belt.

14. A modular conveyor belt as in claim 1 wherein the vertical drive surface is obliquely disposed relative to a transverse axis of the belt.

15. A modular conveyor belt as in claim 1 further comprising no more than one holddown tab extending from the bottom of each row of the belt.

16. A modular conveyor belt as in claim 1 wherein the holddown tabs alternate from side to opposite side row by row.

17. A modular conveyor belt for conveying product in a direction of travel that may include a curved path, comprising:

a plurality of rows of belt modules, each row including a transverse connecting member extending across the width of the row and a first set of hinge elements extending from one side of the transverse connecting member out to a first end of the row and a second set of hinge elements extending from the other side of the transverse connecting member out to a second end of the row, the first set of hinge elements of a row being interleaved with the second set of hinge elements of a successive row and forming openings transversely aligned to provide a passageway for a hinge pin to form a hinge between successive rows, wherein the second set of hinge elements forms fan-shaped apertures as openings for the hinge pin; and a plurality of oblong hinge pins extending through the aligned openings of the interleaved first and second sets of interleaved hinge elements between each row to hingedly interlink successive rows into a conveyor belt;

wherein each oblong hinge pin cooperates with the fan-shaped apertures to permit flexing of the belt about the transverse direction and wherein the oblong hinge pin is tapered along a portion of its length to allow the belt to share the belt load in a turn among the hinge elements at the outside of the turn encompassing the tapered portion of the hinge pin.

18. A modular conveyor belt as in claim 17 further comprising a lug extending downward from an underside of a belt row, the lug including a drive surface.

19. A modular conveyor belt as in claim 1 wherein the drive surface of the lug is disposed obliquely relative to the transverse connecting member.

20. A modular conveyor belt as in claim 17 wherein the first set of hinge elements circumscribe slots elongated in the direction of belt travel.

21. A modular conveyor belt suitable for conveying items in a direction of travel that may include a curved path, comprising:
- a plurality of successive rows of one or more belt modules including a set of hinge elements at each end of each row interleaved with a set of hinge elements of an adjacent row the interleaved sets of hinge elements between each row having aligned openings therethrough forming a transverse passageway; and
- a hinge pin disposed in the passageway between each row to form and endless conveyor belt having a hinge between successive rows, wherein the hinge pin is characterized by an oblong cross section having a long axis in the direction of belt traveling and a by tapered region disposed in the passageway at a side of the belt, the long axis of the oblong cross section of the tapered region increasing in length with distance inwardly from the side of the belt.

22. A modular conveyor belt as in claim 21, wherein one of the interleaved sets of hinge elements at each hinge forms aligned apertures extending from a vertex at the distal end of the hinge elements flaring out to a proximal surface at the proximal ends of the hinge pins to allow the belt to articulate about the hinge pin.

23. A modular conveyor belt as in claim 22, wherein the other of the sets of interleaved hinge elements at each hinge circumscribes aligned slots to accommodate the oblong hinge pin.

24. A modular conveyor belt as in claim 21, wherein the hinge pin further includes a straight region whose oblong cross section is constant.

25. A modular conveyor belt as in claim 24, wherein the hinge pin further includes an intermediate region between the tapered region and the straight region, the cross section of the intermediate region varying monotonically from the straight region to the tapered region.

26. A modular conveyor belt as in claim 21, wherein the long axis of the cross section of the tapered region in the direction of belt travel increases linearly with distance from the side edge of the belt.

27. A modular conveyor belt as in claim 21, wherein the hinge pin includes a leading front surface and a trailing rear surface in the direction of belt travel and wherein the front surface is straight along the length of the hinge pin and the rear surface is parallel to the front surface along a first region and wherein the rear surface tapers toward the front surface with distance toward an end of the hinge pin in the tapered region.

28. A modular conveyor belt as in claim 21, further comprising an extension extending from an underside of a belt row, the extension including an accessory mounting tab for attaching one of a variety of accessories to the belt.

29. A modular conveyor belt as in claim 21, further comprising a drive lug extending downwardly from an underside of a belt row, the drive lug including a drive surface.

30. A modular conveyor belt as in claim 29, wherein the drive surface is oriented oblique to the transverse direction.

31. A hinge pin for an endless modular conveyor belt constructed of a series of rows of belt modules having interleaved hinge elements forming transverse passageways to accommodate a hinge pin between adjacent rows the hinge pin comprising:
- a first region having an oblong cross section with a constant long axis; and
- a second tapered region having an oblong cross section with a long axis that decreases with distance from the first region toward and end of the hinge pin.

32. A hinge pin as in claim 31, further comprising a third intermediate region disposed between the first region and the second tapered region, wherein the long axis of the cross section of the intermediate region varies monotonically in length between the first region and the second tapered region.

33. A hinge pin as in claim 31, wherein the cross section of the hinge pin through the first region and the second region is oval in shape.

34. A hinge pin as in claim 31, further comprising another second tapered region, and wherein the first region is disposed at the central portion of the hinge pin between both of the second tapered regions.

35. A hinge pin as in claim 31, further comprising a tab extending from the end of the hinge pin.

* * * * *